United States Patent [19]

Ouellette

[11] 4,093,935

[45] June 6, 1978

[54] EXPANDABLE TRANSDUCER ARRAY

[75] Inventor: Charles W. Ouellette, Portsmouth, R.I.

[73] Assignee: Raytheon Company, Lexington, Mass.

[21] Appl. No.: 792,439

[22] Filed: Apr. 29, 1977

Related U.S. Application Data

[63] Continuation of Ser. No. 682,422, May 3, 1976, abandoned.

[51] Int. Cl.2 .......... H04B 13/00

[52] U.S. Cl. .......... 340/8 S; 340/9; 343/710; 343/880; 343/915

[58] Field of Search .......... 340/7, 8 R, 9, 10, 11, 340/12, 13, 391; 181/163, 172; 343/705, 709, 710, 880-882, 915; 9/8 R

[56] References Cited

U.S. PATENT DOCUMENTS

| | | | |
|---|---|---|---|
| 3,098,229 | 7/1963 | Raabe | 343/705 |
| 3,152,330 | 10/1964 | Chatelaen | 343/705 |
| 3,720,909 | 3/1973 | Sikora | 340/8 R |
| 3,739,538 | 6/1973 | Rubin | 343/881 |
| 3,832,762 | 9/1974 | Johnston | 340/8 R |
| 3,864,772 | 2/1975 | Gogolick et al. | 9/8 R |

*Primary Examiner*—Harold J. Tudor
*Attorney, Agent, or Firm*—David M. Warren; Joseph D. Pannone; Milton D. Bartlett

[57] ABSTRACT

An array of sonar transducers enclosed within a flexible webbing and having spring members located between the transducers for urging the transducers against the webbing to provide a rigid structure which secures the transducers in their positions in the array. The webbing is stowed in spaces between the transducers with the array being in a compressed attitude and secured within an outer canister to permit air dropping of the array into the ocean.

3 Claims, 3 Drawing Figures

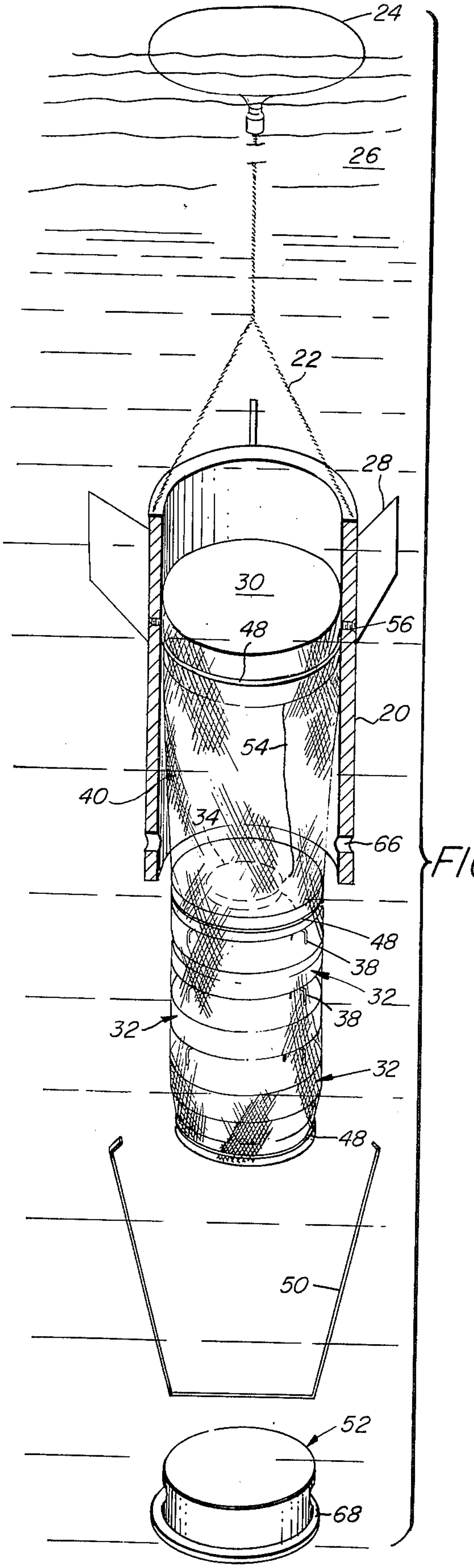
FIG. 2
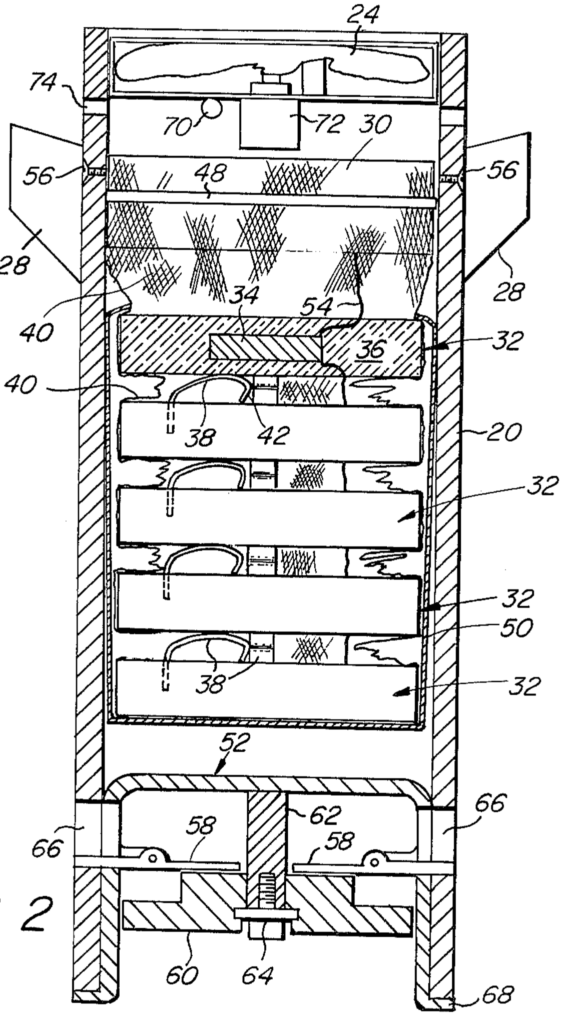
FIG 1
FIG. 3
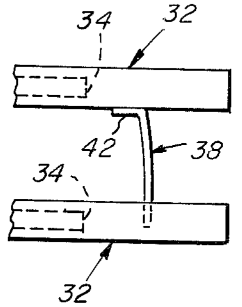

EXPANDABLE TRANSDUCER ARRAY

CROSS-REFERENCE TO RELATED CASES

This is a continuation of application Ser. No. 682,422, filed May 3, 1976, now abandoned.

BACKGROUND OF THE INVENTION

This invention relates to expandable arrays of electromagnetic radiating elements and sonar transducers, and more particularly to an expandable array wherein structural rigidity is obtained by urging the radiating elements or transducers against a flexible enclosure.

Arrays of electromagnetic radiating elements and arrays of sonar transducers are sometimes provided with the facility of being stowed in a configuration which is much smaller than the overall dimensions of the array when the radiating elements of transducers are being deployed for the transmission and reception of radiant energy. A situation frequently encountered by sonar transducers is that in which an array of transducers is dropped from an aircraft into the ocean, the array of transducers being stowed in a compact configuration during the airdrop so as to protect the transducers at the time of impact with the surface of the ocean, the transducers then being allowed to move apart from each other under water to provide an array of the transducers having a desired configuration.

A problem arises in that the stowage of transducer elements in a protective housing is best accomplished with a minimum of additional weight and equipment utilized in positioning the transducer elements in their respective positions in the underwater array. An additional problem arises in that in certain applications, the array of transducers is required to have a rigid configuration independently of water movement to insure a prescribed pattern of radiation.

SUMMARY OF THE INVENTION

The aforementioned problems are overcome and other advantages are provided by a transducer positioning system which, in accordance with the invention, provides for a flexible enclosure, such as a webbing or netting material wherein the transducers are positioned by springs which urge the transducers apart and against the enclosure to provide a rigid structure of spaced apart transducers, the transducers being arranged in an array of a prescribed format. By compressing the springs, the transducers are brought in proximity to each other in a compacted array configuration having overall dimensions which are much smaller than the foregoing expanded array configuration. The compacted array configuration is readily secured within an outer housing such as a canister. The individual springs in their compressed configuration are situated between adjacent transducers and maintain a minimal spacing between the adjacent transducers which is sufficient to accommodate stowage of the webbing or netting material from which the enclosure is fashioned. An encircling spring member is passed around the compacted array of transducers and the stowed enclosure for releasably securing the compacted array in the canister. In a preferred embodiment of the invention, the canister is provided with a float secured to its upper end, the upper end thereof also including electronic signal processing circuitry. The canister with its circuitry and the transducer array are suspended beneath the surface of the ocean by the float.

BRIEF DESCRIPTION OF THE DRAWINGS

The aforementioned aspects and other features of the invention are explained in the following descriptions taken in connection with the accompanying drawings wherein:

FIG. 1 is a sectional view of a canister enclosing an array of transducer elements in a compacted configuration having the springs and webbing in accordance with the invention;

FIG. 2 is a view, partially in section, of the transducer array of FIG. 1 in an expanded configuration supported by a float, a releasable cap and spring being shown separated from the canister; and FIG. 3 is a detailed view of a spring between two transducer elements of the array in the expanded configuration.

DESCRIPTION OF THE PREFERRED EMBODIMENT

Referring now to the figures, a canister 20 is secured via lines 22 to a float 24 which supports the canister 20 at the surface of the ocean 26. Vanes 28 are secured circumferentially about the canister 20 for guiding the canister 20 through the air when the canister is dropped from an aircraft (not shown) to the ocean 26. The upper portion of the canister 20 encloses an electronics unit 30 which includes signal processing equipment for the generation and reception of sonar signals. While the preferred embodiment of the invention utilizes sonar transducers submerged in a liquid medium, it is to be understood that the webbing and spring mechanism, to be described hereinafter, applies equally well to electromagnetic radiating elements which may be, by way of example, suspended in the air by a parachute for telemetry purposes.

In accordance with the invention, an array of transducers 32 is shown by FIG. 1 in a compacted format within the canister 20, and is also shown by FIG. 2 in an expanded configuration suspended beneath the canister 20. Each transducer 32 includes a piezoelectric transducer element 34 encased in a polyurethane coating 36 which prevents the entry of water into the transducer element 34 and also secures springs 38 in a fixed relationship to the transducer 32.

In the expanded array, the springs 38 urge the transducers 32 apart against the tensile stresses of a webbing 40, the combined forces of the springs 38 and of the webbing 40 serving to secure the transducers 32 in a rigid configuration. In the compacted array, tangs 42 maintain a minimal spacing between adjacent transducers 32 so that folds of the webbing 40 can be stowed between the adjacent transducers 32. The webbing 40 is secured to the electronics unit 30 as well as to the top and bottom transducers 32 by means of retaining rings 48 which may be formed of an elastomeric material or of press-fitted metallic springs. The springs 38 secured to each of the transducers 32 are symmetrically positioned about the axis of each transducer 32 to urge an axial displacement of one transducer 32 relative to its neighbor. The springs 38 are of equal length so that the transducers 32 are oriented transversely of a common axis.

With respect to the compacted array of transducers 32, a spring clip 50 surrounds the array of transducers 32 and the webbing 40 and make frictional contact with the interior surface of the canister 20. Upon striking the surface of the ocean 26, a releasable cap 52 (such as that disclosed in U.S. Pat. No. 3,646,505 which issued in the name of Kirby on Feb. 29, 1972) separates from the bottom of the canister 20 whereupon the clip 50 slides along the interior surface of the canister 20 thereby permitting the array of transducers 32 to drop out of the bottom of the canister 20. The clip 50 thereafter falls away from the transducers 32. Electrical conductors 54 couple the transducer elements 34 to the electronics unit 30, the conductors 54 passing through the coating 36 so as to be secured to the transducers 32 for making electrical contact with the transducer elements 34. The electronics unit 30 is secured to the canister 20 by screws 56. The webbing 40 secured to the electronics unit 30 by ring 48 insures that the expanded array of transducers 32 remains physcially coupled to the canister 20 and the electronics unit 30.

The cap 52 is secured by pivotably mounted arms 58 which rest against a plate 60. The plate 60 is slideably mounted mounted about a post 62 and secured thereto by a deformable washer 64, the post 62 being mounted on the cap 52. Upon impact with the surface of the ocean, the plate 60 is thrust toward the transducers 32 deforming the washer 64 and sliding along the post 62 to bend the arms 58 and urge them out of apertures 66. Thereby the cap 52 is released and falls away from the canister 20. A lip 68 on the cap 52 prevents the ocean from pushing it inwardly toward the transducer 32.

A flotation assembly on top of the electronics unit 30 comprises the aforementioned float 24 and lines 22 as well as a water-activated squib battery and circuit 70 coupled to a compressed gas and firing pin assembly 72. Upon submersion in the ocean, ports 74 admit water to activate the squib battery and circuit 70 which, in turn, activates the assembly 72 to release the compressed gas. The compressed gas releases and inflates the float 24.

It is understood that the above described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A transducer system comprising:

a housing having an opening in an end thereof;

floatation means secured to said housing at an end thereof opposite said opening for floating said housing in a fluid medium;

an array of transducer elements arranged along a central axis of said array;

a cap closing said opening for securing said transducer elements within said housing, said cap being released upon impact with said fluid, said transducer elements being slidably secured within said housing to permit their exit via said opening upon said releasing of said cap;

spring means for expanding said array of transducer elements subsequent to their exit from said housing; and a flexible enclosure extensible through said opening and secured to said housing, said housing surrounding said array for constraining said transducer elements against forces of said spring means to occupy predetermined locations upon the expansion of said array, said enclosure having apertures therein for admission of said fluid to contact said elements for communication of radiation thereto, said spring means comprising spring elements located between said transducer elements and symmetrically positioned about said axis for maintaining said transducer elements in a predetermined orientation relative to said axis.

2. A system according to claim 1 wherein said transducer elements are enclosed by a water impervious coating, said coating serving as a support for securing said springs in a fixed relationship to corresponding ones of said transducer elements, said enclosure being formed of a webbing material, and said coating providing a matching impedance between said transducer elements and said fluid medium.

3. A system according to claim 2 wherein each spring element has a tang for providing a minimal space between adjacent ones of said transducers, said minimal space serving as a stowage region for said spring means for said flexible enclosure, said system further comprising a clip positioned around said transducer elements and said enclosure and in contact with said housing, said clip sliding past said housing in response to a deceleration thereof.

* * * * *